United States Patent Office 3,423,484
Patented Jan. 21, 1969

3,423,484
ULTRAVIOLET STABILIZERS FOR POLYMERS
John P. Allison, Detroit, Mich., assignor to General Motors Corporation, Detroit, Mich., a corporation of Delaware
No Drawing. Filed May 9, 1966, Ser. No. 548,415
U.S. Cl. 260—901  9 Claims
Int. Cl. C08f 45/58, 29/50

ABSTRACT OF THE DISCLOSURE

A polymeric ultraviolet stabilizer for vinyl polymers such as polymethylmethacrylate is disclosed. The polymeric stabilizer is the reaction product of a quinone having at least one unsubstituted carbon atom in the position adjacent to or one carbon atom removed from the carbonyl group in the basic quinone ring structure such as p-benzoquinone, and an aldehyde copolymer such as a methacrylaldehyde-methylmethacrylate copolymer.

---

This invention relates to ultraviolet stabilizers for polymers and more particularly to the formation in situ in a polymer of a polymeric ultraviolet stabilizer.

Ultraviolet stabilizers are widely used to prevent polymers from discoloring upon aging under the influence of ultraviolet light. The two types of stabilizers most frequently used to inhibit discoloration of polymers are the salicyclic acid esters such as phenylsalicylate, methylsalicylate, ethyl-salicylate, diisopropylene glycolsalicylate, isopropylsalicylate, isoamylsalicylate and isobutylsalicylate and the hydroxy substituted phenones such as ortho hydroxy acetophenones, 2,4 dihydroxy benzophenones, 2,2′ dihydroxy benzophenones and dihydroxy acetophenones. These generally excellent stabilizers are not entirely free from disadvantages; for example only a limited amount of stabilizer can be added to protect against discoloration since exceeding that amount either produces no added inhibitory action against discoloration, or else it actually tends to produce discoloration. Excessive amounts of these inhibitors may cause deleterious effects on the physical quality of the polymer. Excessive amounts of the phenone-type compounds have a tendency to impart a yellow color in the polymer. It is also well known that once the stabilizer is used up, the polymer will be subject to discoloration since no additional stabilizer can be added. Another disadvantage is that these monomeric stabilizers have a tendency to migrate out of the surface of the polymer because the molecular weight of these monomeric stabilizers is low in contrast to the high molecular weight of the polymers.

It is the primary object of this invention to provide an improved class of ultraviolet stabilizers for polymers which are polymeric in nature so as to become an integral part of the polymer system, which have extremely low mobility or tendency to migrate out of the surface of the polymer, and which are formed continuously in situ in the polymer as needed by the action of the ultraviolet light. These and other objects are accomplished by mixing the polymer system to be stabilized with a copolymer containing aldehyde groups therein and a quinone-type compound having at least one unsubstituted carbon atom adjacent to or one carbon atom removed from the carbonyl group in the basic quinone ring structure such as p-benzoquinone. Exposure of the polymer system to ultraviolet irradiation initiates or causes a reaction between the copolymer aldehyde groups and the quinone-type compound to form in situ a polymeric ultraviolet stabilizer which inhibits discoloration of the polymer system. Another embodiment of this invention consists of a mixture of a copolymer containing an aldehyde group therein and a quinone having at least 1 ortho position unsubstituted. Exposure of this system to ultraviolet light forms a polymeric ultraviolet stabilizer which protects the polymeric system from degradation due to ultraviolet light.

Further objects and advantages of the present invention will be apparent from the following detailed description, reference being had to the following examples wherein the preferred embodiments of the present invention are clearly shown.

The new class of ultraviolet stabilizers are polymers having an orthohydroxy acetophenone-type structure connected therein. The structure of a typical polymeric ultraviolet stabilizer formed in accordance with this invention when a methacrylaldehyde-methyl methacrylate copolymer is exposed to ultraviolet radiation in the presence of p-benzoquinone is shown below.

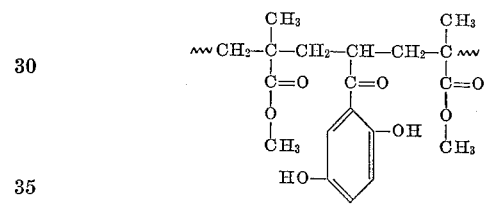

These polymeric ultraviolet stabilizers are formed in situ in the polymeric system to be stabilized by the ultraviolet light induced reaction which occurs between a copolymer containing aldehyde groups therein such as methacrylaldehyde-methyl methacrylate and a quinone-type compound having at least one unsubstituted carbon atom adjacent to or one carbon atom removed from the carbonyl group in the basic quinone ring structure such as p-benzoquinone. The extent of this reaction is governed by the time of exposure to and the intensity of the ultraviolet light. The polymeric ultraviolet stabilizer is formed in situ when it is needed and is continually being formed in situ when it is needed to protect the polymeric system from discoloration caused by the exposure through ultraviolet light.

As indicated above, the polymeric ultraviolet stabilizer is formed by reacting in situ a copolymer containing aldehyde groups therein with a compound having a quinone-type structure. The copolymers containing aldehyde groups therein are formed by reacting a polymerizable, ethylenically unsaturated compound such as an acrylic monomer with an aldehyde having a polymerizable, ethylenically unsaturated bond such as methacrylaldehyde. A methacrylaldehyde-methyl methacrylate copolymer is a typical example of the type of copolymer required and is formed by reacting methyl methacrylate with methacrylaldehyde.

In general, the polymerizable aldehyde which is used to form the copolymer falls into one of two types. Type 1 has the following structure:

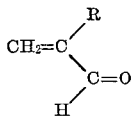

where R is hydrogen, an alkyl group or an aryl group. Examples of the Type 1 polymerizable aldehyde are acrylaldehyde, methacrylaldehyde, and ethacrylaldehyde. Type 2 has the following structure:

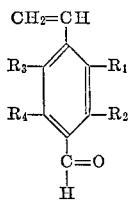

where $R_1$, $R_2$, $R_3$, and $R_4$ is hydrogen, chlorine, an alkyl group, an aryl group, or an alkoxy group. Examples of the Type 2 polymerizable aldehyde are p-vinyl benzaldehyde, o-methyl p-vinyl benzaldehyde, o-methoxy p-vinyl benzaldehyde, o-chloro p-vinyl benzaldehyde and the like.

The polymerizable ethylenically unsaturated compound which is polymerized with the polymerizable aldehyde to form the copolymer may be an acrylic monomer such as methyl methacrylate, ethyl methacrylate, methyl acrylate, ethyl acrylate, and the like, styrene, acrylonitrile, acrylamide, methacrylonitrile, vinyl acetate and the like. Methyl methacrylate and styrene are preferred monomers because of their low cost. Included in the term acrylic monomer as used herein and as illustrated in the examples, refers to esters of acrylic acid and methacrylic acid. These esters are formed by reacting one of the acids mentioned above with an alcohol or a substituted alcohol containing 1 to 18 carbon atoms. Suitable alcohols include methyl alcohol, butyl alcohol, hexyl alcohol, 2-ethyl hexyl alcohol, decyl-octyl alcohol, lauryl alcohol, stearyl alcohol, dimethylaminoethyl alcohol, t-butylaminoethyl alcohol, glycidyl alcohol, and 2-methoxyethyl alcohol.

The concentration of the aldehyde in the copolymer ranges from about 5% to 50%. At concentrations below 5% aldehyde the resulting copolymer does not have enough aldehyde groups with which to react with the quinone-type compound to form an effective polymeric ultraviolet stabilizer. Concentrations above 50% aldehyde in these copolymers are not desirable since the aldehyde groups in such copolymers have a tendency to react with one another to form undesirable reaction products which cause the resulting copolymers to be incompatible with other polymers. In a methacrylaldehyde-methyl methacrylate copolymer the maximum concentration of methacrylaldehyde that may be conveniently obtained is 25%.

The following examples describing the preparation of representative copolymers suitable to be used in forming the polymeric ultraviolet stabilizer are given to assist one in the practice of this invention.

A. Methacrylaldehyde-methyl methacrylate copolymer

A solution containing 21.5 grams methacrylaldehyde, 135 grams methyl methacrylate, 80 grams benzene and 0.1 gram azobisisobutyronitrile was stirred for 2 hours at 60° C. under nitrogen. An additional 0.1 gram of azobisisobutyronitrile catalyst was added and the reaction was continued for 4 hours. The temperature was then increased to 80° C. to destroy or use up any remaining catalyst. The reaction mixture was then flushed with nitrogen to remove any unreacted methacrylaldehyde. The copolymer was precipitated in heptane, dissolved in acetone, and reprecipitated in heptane. The copolymer contained 22% methacrylaldehyde. The structure of the copolymer formed in this example is shown below.

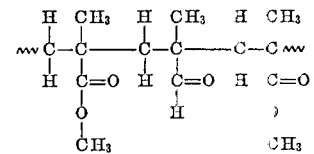

B. The methacrylaldehyde-styrene copolymer

A solution containing 4.2 grams methacrylaldehyde, 27 grams styrene, 20 grams benzene and 0.1 gram azobisisobutyronitrile was stirred for 4 hours at 60° C. under nitrogen. An additional 0.1 gram of azobisisobutyronitrile catalyst was added and the reaction was continued for 12 hours. The temperature was increased to 80° C. to destroy or use up any remaining catalyst. The reaction mixture was then flushed with nitrogen to remove any unreacted methacrylaldehyde. The copolymer was precipitated in methanol. The copolymer contained about 20% methacrylaldehyde.

C. Acrylaldehyde-methyl methacrylate copolymer

A solution containing 1.0 gram acrylaldehyde, 9.9 grams methyl methacrylate, 33.3 grams benzene and 0.013 gram azobisisobutyronitrile was stirred at 60° C. for 46 hours. The copolymer was precipitated in heptane, dissolved in acetone, and reprecipitated in heptane. The copolymer contained 16% acrylaldehyde.

The copolymers containing aldehyde groups thereon, as described above, are reacted with compounds having a quinone-type structure having at least one unsubstituted carbon atom adjacent to or one carbon atom removed from the carbonyl group in the basic quinone ring structure. The preferred compound is p-benzoquinone. Other compounds which may be used successfully in the practice of this invention are 1,2-benzoquinone, 1,2-naphthoquinone, 1,4-naphthoquinone, 9,10-anthraquinone, phenanthraquinone and the like.

The process of the present invention will hereinafter be described in detail in terms of incorporating methacrylaldehyde-methyl methacrylate copolymer and p-benzoquinone in a polymethyl methacrylate system wherein the methacrylaldehydemethyl methacrylate copolymer and the p-benzoquinone react under exposure to ultraviolet light to form a polymeric ultraviolet stabilizer which inhibits the polymethyl methacrylate polymer system from discoloring.

In general, a suitable amount of the methacrylaldehyde-methyl methacrylate copolymer and an equal molar percent of the p-benzoquinone is mixed with the polymethyl methacrylate system until a homogeneous mixture is obtained. The concentration of the copolymer in this solution ranges from about 0.1 to 10 mole percent aldehyde. The concentration of the copolymer in the polymethyl methacrylate depends upon the concentration of the aldehyde in the copolymer since it is the aldehyde group which reacts with the p-benzoquinone to form the part of the structure which has the stabilizing effect against ultraviolet radiation. The concentration of the p-benzoquinone is the same as the aldehyde and therefore, ranges from about 0.1 to 10 mole percent. When the polymeric system containing the polymer, copolymer, and p-benzoquinone is exposed to ultraviolet light, the copolymer and the p-benzoquinone react and form in situ a polymeric stabilizer which inhibits the discoloration of the polymethyl methacrylate.

The followng examples are given to illustrate the invention but are not to be construed as limiting the scope of the invention.

Example No. 1

A mixture, 0.35 gram, of polymethyl methacrylate and methyl methacrylate-acrylaldehyde copolymer containing 10.9 mole percent acrylaldehyde was poured into a Vycor test tube and dissolved in a mixture containing 5 milliliters distilled benzene, 25 milliliters distilled tetrahydrofuran and 0.35 gram 1,4-benzoquinone. The Vycor glass tube containing this solution was evacuated by standard vacuum degassing techniques to a press of $10^{-2}$ torr. The solution under vacuum in the Vycor glass tube was exposed to an intense source of ultraviolet light such as a Rayonet photochemical reactor having an intensity of $1.65 \times 10^{16}$ photons sec.$^{-1}$ cm.$^{-3}$ for 20 minutes, at a wavelength of 2537 Angstroms.

In accordance with this invention, the polymeric ultraviolet stabilizer was formed during the exposure to ultraviolet light by the 1,4-benzoquinone reacting with the aldehyde group on the copolymer.

The stabilizing effect of this polymer against degradation caused by ultraviolet light was observed from the following test. The polymer mass obtained in Example No. 1 containing the poly (methyl methacrylate), the unreacted copolymer, and the polymeric ultraviolet stabilizer formed by reacting the copolymer with the benzoquinone was separated from the benzene solution by dissolution in benzene and precipitation into n-heptane. The polymeric mass thus obtained was washed and dried. The weight average molecular weight of this polymeric mass was determined by standard viscosity measurement techniques and identified as $\overline{M}w_1$. The polymer was then deposited in a finely divided form around a tube and irradiated with the ultraviolet light source described previously at 30° C. in a vacuum having a pressure of $10^{-4}$ torr for a time period of 1 hour. The irradiated polymer mass was dissolved in benzene and recovered by freeze drying. The weight average molecular weight of the treated polymer after the 1 hour exposure to ultraviolet light was determined and identified as $\overline{M}w_2$. The degree of degradation caused by exposure to ultraviolet light is calculated from the following formula:

Degree of degradation=

$$\frac{\overline{M}w_1 - \overline{M}w_2}{\overline{M}w_2}$$

where $\overline{M}w_1$ is the weight average molecular weight of the original polymer after exposure to ultraviolet light for 20 minutes in the presence of quinone and $\overline{M}w_2$ is the weight average molecular weight of the treated polymer after further exposure to ultraviolet light for 1 hour.

The degree of degradation of the polymer system described in Example No. 1 resulting from the 1 hour exposure to ultraviolet light was 3.3 in contrast to the high value of 15.5 for the same system in the absence of the polymeric ultraviolet stabilizer.

Examples 2 through are polymeric ultaraviolet stabilizers which are the reaction products of 1,4-benzoquinone, 1,4-naphthoquinone and 9,10-anthraquinone with either the methyl methacrylate-acrylaldehyde copolymer or with the methyl methacrylate-methacrylaldehyde copolymer.

The following table lists the degree of degradation or the protection afforded polymeric systems by the polymeric ultraviolet stabilizers formed in Examples 1 through 6 in accordance with this invention.

| Example No. | Polymeric System | | | | Degree of Degradation, $\frac{\overline{M}w_1 - \overline{M}w_2}{\overline{M}w_2}$ |
|---|---|---|---|---|---|
| | Polymethyl Methacrylate | Methyl methacrylate Copolymer | | Quinone | |
| | | Acrylaldehyde | Methacrylaldehyde | | |
| A | X | X | | | [1] 15.5 |
| 1 | X | X | | 1,4-benzoquinone | 3.3 |
| 2 | X | X | | 1,4-naphthoquinone | 4.5 |
| 3 | X | X | | 9,10-anthraquinone | 5.4 |
| B | X | | X | | [1] 8.0 |
| 4 | X | | X | 1,4-benzoquinone | 4.9 |
| 5 | X | | X | 1,4-naphthoquinone | 3.4 |
| 6 | X | | X | 9,10-anthraquinone | 5.1 |

[1] $\overline{M}w_1$ is the original weight molecular weight.

It can be seen from the data tabulated for Examples 1, 2 and 3 that the reaction product of 1,4-benzoquinone, 1,4-naphthoquinone and 9,10-anthraquinone with the methyl methacrylate-acrylaldehyde copolymer reduced the degradation caused to the polymeric system by the action of ultraviolet light from 15.5% to 3.3, 4.5 and 5.4%. Similarly, it can be seen from Examples 4, 5 and 6 that the reaction product between the methyl methacrylate-methacrylaldehyde copolymer and 1,4-benzoquinone, 1,4-naphthoquinone and 9,10-anthraquinone reduced the degradation of polymer system from 8.0% to 4.9, 3.4, and 5.1%.

Whereas the polymeric ultraviolet stabilizer in the practice of this invention may be used as the only stabilizer in a polymeric system, it is also possible to employ this polymeric stabilizer in polymeric systems having a monomeric ultraviolet stabilizer. In the latter instance, the monomeric stabilizer would provide protection against degradation of ultraviolet light during the initial period in which the ultraviolet light is first causing the polymeric ultraviolet stabilizer to be formed.

This invention provides a process whereby polymers are stabilized from discoloration caused by ultraviolet light with the help of polymeric stabilizers offering several advantages over conventional stabilizers. Thus, the polymeric stabilizer containing the orthohydroxyphenone-type structure therein is formed in situ as needed by the action of ultraviolet light, thereby extending the useful life of the polymers. In view of the polymeric nature of these stabilizers which results in extremely low mobility, the stabilizers have little tendency to migrate out of the surface. Another advantage is that the polymeric stabilizers do not introduce any monomeric residues in the polymers and as a result provide a more stable polymer system which has a higher resistance to oxidation and chemical attack.

While the invention has been described in terms of a preferred embodiment, it is to be understood that it is not limited thereby except as defined in the following claims.

I claim:

1. A method for stabilizing vinyl polymers in a mixture containing said polymer, a vinyl copolymer containing an aldehyde group therein and a quinone from the discoloration caused by ultraviolet light comprising the steps of mixing said polymer with said vinyl copolymer, said copolymer being used at a concentration such that the aldehyde group is at a concentration of 0.1 to 10 mole percent of said mixture, and with 0.1 to 1.0 mole percent of said mixture of a quinone having at least one unsubstituted carbon atom in the position adjacent to or one carbon atom removed from the carbonyl group in the basic quinone ring structure, said polymer being stabilized by the reaction product of said quinone with said aldehyde copolymer which is a polymer having an ortho hydroxy acetophenone-type structure,

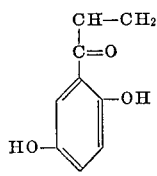

2. A process according to claim 1 wherein said copolymer contains 5 to 50 weight percent polymerized aldehyde monomer.

3. A process according to claim 1 wherein said copolymer contains an aldehyde of the formula

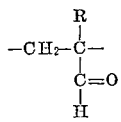

where R represents a member of the group consisting of hydrogen, an alkyl group and an aryl group.

4. A process according to claim 1 wherein said copolymer contains a group of the formula

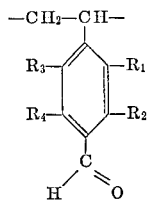

where $R_1$, $R_2$, $R_3$, and $R_4$ represent a member of the group consisting of hydrogen, chlorine, alkyl group, aryl group and an alkoxy group.

5. A process according to claim 1 wherein said copolymer contains polymerized monomers where said monomers are taken from the group consisting of acrylic monomers, styrene, acrylonitrile, methacrylonitrile, and vinyl acetate.

6. A process according to claim 1 wherein said quinone is taken from the group consisting of p-benzoquinone, phenanthraquinone, naphthoquinone and anthraquinone.

7. In the stabilization of methylmethacrylate polymers in a mixture containing said polymer, a vinyl copolymer containing an aldehyde group therein and a quinone from the discoloration caused by ultraviolet light, the improvement which comprises reacting a methacrylaldehyde-methylmethacrylate copolymer at a concentration such that the aldehyde group has a concentration of 0.1 to 10 mole percent of said mixture with 0.1 to 10 mole percent of said mixture of a quinone having at least one carbon atom unsubstituted in the position adjacent to or one carbon atom removed from the carbonyl group in the basic quinone ring structure in the presence of said polymer, whereby the reaction product of said quinone and said copolymer is a polymer having an orthohydroxy acetophenone-type structure

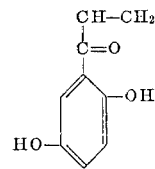

which serves as a polymeric ultraviolet stabilizer which inhibits discoloration of said polymer.

8. A process according to claim 7 wherein said polymers contain a monomeric ultraviolet stabilizer.

9. A hard vinyl polymeric product characterized by outstanding resistance to the harmful effects of light comprising an interpolymer of an acrylic polymer, a vinyl copolymer containing an aldehyde group therein, said copolymer being used at a concentration such that the aldehyde group has a concentration of 0.1 to 10 mole percent of said product, and 0.1 to 10 mole percent of said product of a quinone having at least one ortho position unsubstituted, said interpolymer forming in situ upon the exposure to ultraviolet light a polymeric ultraviolet stabilizer having an o-hydroxy acetophenone-type group therein of the structure

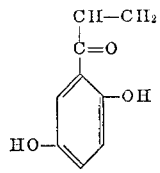

comprising the reaction product of said quinone and said aldehyde copolymer whereby said interpolymer is protected from discoloration caused by exposure to ultraviolet light.

References Cited

UNITED STATES PATENTS

| | | | |
|---|---|---|---|
| 2,540,886 | 2/1951 | Hurst et al. | 260—64 |
| 2,632,753 | 3/1953 | Anderson | 260—45.7 |
| 3,054,767 | 9/1962 | Quinn | 260—45.7 |
| 3,172,872 | 3/1965 | Kraus et al. | 260—45.7 |
| 3,281,496 | 10/1966 | Rice et al. | 260—45.7 |
| 3,296,186 | 1/1967 | Gunkel | 260—45.7 |

MURRAY TILLMAN, *Primary Examiner.*

J. W. SNOW, *Assistant Examiner.*

U.S. Cl. X.R.

260—67, 73, 64, 45.7, 898

UNITED STATES PATENT OFFICE
CERTIFICATE OF CORRECTION

Patent No. 3,423,484                     January 21, 1969

John P. Allison

It is certified that error appears in the above identified patent and that said Letters Patent are hereby corrected as shown below:

Column 5, line 4, "0.35" should read -- 0.035 --; line 24, "press" should read -- pressure --; line 71, after "through" insert -- 6 --.

Signed and sealed this 24th day of March 1970.

(SEAL)
Attest:

Edward M. Fletcher, Jr.                 WILLIAM E. SCHUYLER, JR.
Attesting Officer                         Commissioner of Patents